(12) United States Patent
Wheeler

(10) Patent No.: US 9,614,928 B1
(45) Date of Patent: *Apr. 4, 2017

(54) SYSTEM AND METHOD FOR COMMUNICATION BETWEEN NETWORKED APPLICATIONS

(71) Applicant: OPEN INVENTION NETWORK LLC, Durham, NC (US)

(72) Inventor: Thomas T. Wheeler, Frisco, TX (US)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,806

(22) Filed: Jan. 19, 2016

Related U.S. Application Data

(63) Continuation of application No. 13/078,949, filed on Apr. 2, 2011, now Pat. No. 9,240,952.

(51) Int. Cl.
*G06F 15/16* (2006.01)
*H04L 29/08* (2006.01)

(52) U.S. Cl.
CPC .......... *H04L 67/2842* (2013.01); *H04L 67/02* (2013.01); *H04L 67/06* (2013.01); *H04L 67/10* (2013.01)

(58) Field of Classification Search
CPC ..... H04L 67/22; H04L 67/2819; H04L 29/06; H04L 63/0807; H04L 67/02; H04L 67/306; H04L 12/14; H04L 63/02; H04L 63/14; H04L 63/162; G07F 17/16; G07F 17/26; G07F 17/32; G07F 17/3227
See application file for complete search history.

*Primary Examiner* — Arvin Eskandarnia
*Assistant Examiner* — Thao Duong
(74) *Attorney, Agent, or Firm* — Haynes and Boone, LLP

(57) ABSTRACT

During communication of a large data message from a client application to a server application, requirements to communicate smaller control messages can arise. To facilitate timely communication of control messages, a client application may include a chunking module that divides a data message into chunks that can be sent as a sequence of individual data message packets. When a control message needs to be sent, the sequence of data message packets can be interrupted to send a control message packet. At the server application, the sequence of message packets is processed so that data message packets are appended to a data message and control messages are extracted for immediate processing.

20 Claims, 4 Drawing Sheets

SYSTEM AND METHOD FOR COMMUNICATION BETWEEN NETWORKED APPLICATIONS

CROSS-REFERENCE TO RELATED APPLICATIONS

This application claims priority of and is a continuation of U.S. Ser. No. 13/078,949, entitled SYSTEM AND METHOD FOR COMMUNICATION BETWEEN NETWORKED APPLICATIONS, filed on Apr. 2, 2011, now issued U.S. Pat. No. 9,240,952, issued on Jan. 19, 2015, incorporated herein by reference in its entirety

FIELD OF THE INVENTION

This disclosure relates to data communication protocols and in particular, though not exclusively, to data communication between networked applications.

BACKGROUND OF THE INVENTION

Modern networked applications have increasing needs for data communication on the network. Generally, this data falls into two categories: (1) small control messages such as web browser requests or remote procedure calls; and (2) large data messages such as video files and other multimedia documents. Communication between two networked applications takes place over a network connection. A problem arises when an application needs to send a small data message while the network connection is being used to send a large message such as an 8 mega-pixel image, especially when transfer of the small data message is time-sensitive.

One existing solution to this problem is for the application to use two network connections: one for small control messages, and the other for large data messages. This solution is employed by the FTP (File Transfer Protocol) standard. The drawback with this solution is in the overhead and inefficiency of using a second network connection. Control messages are typically sent infrequently, resulting in the second network connection being under-utilized. A second solution is for the application to wait for the large message to be sent, and then send the smaller control message. While this is acceptable for some application needs, if the control message is time-sensitive this solution is inadequate.

SUMMARY OF THE INVENTION

To facilitate timely communication of control messages, a client application may include a chunking module that divides a data message into chunks that can be sent as a sequence of individual data message packets. When a control message needs to be sent, the sequence of data message packets can be interrupted to send a control message packet. At the server application, the sequence of message packets is processed so that data message packets are appended to a data message and control messages are extracted for immediate processing.

In one aspect of the disclosure, there is provided a method for communication between a client device and a server device. The method may comprise determining a need in the client device to send a data message from the client device to the server device. The data message may be divided into chunks in the client device and sequentially sent from the client device to the server device. During the sending of the chunks, a control message may be sent from the client device to the server device between chunks of the data message.

In one aspect of the disclosure, there is provided a method for receiving communications into a server application of a server device from a client application of a client device. The method may comprise receiving a message packet into the server application of the server device and determining in the server application whether the message packet is a data message packet or a control message packet. If the message packet is a control message packet, the control message packet may be processed to perform a control operation indicated by the control message packet. If the message packet is a data message packet, data of the data message packet may be appended to a data message at the server application.

In one aspect of the disclosure, there is provided a system comprising a client application executing on a client device and a server application executing on a server device in which the client application and the server application are configured to communicate with each other. The client application may comprise a client chunking module configured to generate a sequence of message packets for a data message and to intersperse one or more control message packets into the sequence of message packets. The server application may comprise a server chunking module and a server data transfer module. The server chunking module may be configured to receive the sequence of message packets from the client application, process the sequence of message packets to reconstitute a data message, and extract a control message from the sequence of message packets. The server data transfer module may be configured to receive a control message from the server chunking module, and enact a control operation indicated by the control message while the data message is being received from the client application.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
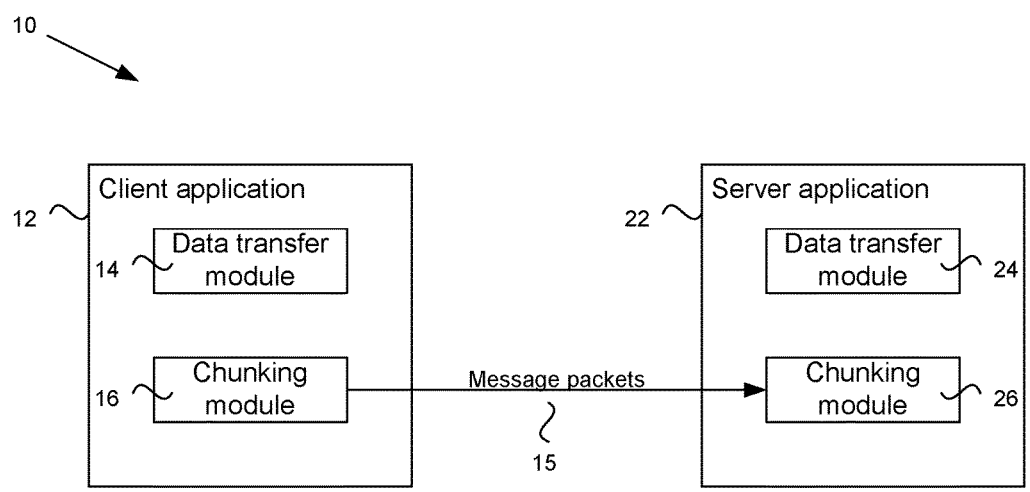
FIG. 1 shows a system for communication between a client application and a server application.

In FIG. 1, there is shown a system 10 on which the network communications methods may be utilized. The system 10 includes a first and second mobile applications executing on mobile devices. A first application may act as a client application 12 (communication source) to the second application that acts as a server application 22 (communication destination), though the choice of client and server may change depending on context. In one implementation, the client application and server application may each be mobile applications executing on respective mobile devices. Alternatively, one or both of the client and server may be executing on fixed devices.

The client application 12 sends both small control messages and large data messages and the server application 22 receives and operates on the control and data messages.

Figure 2:
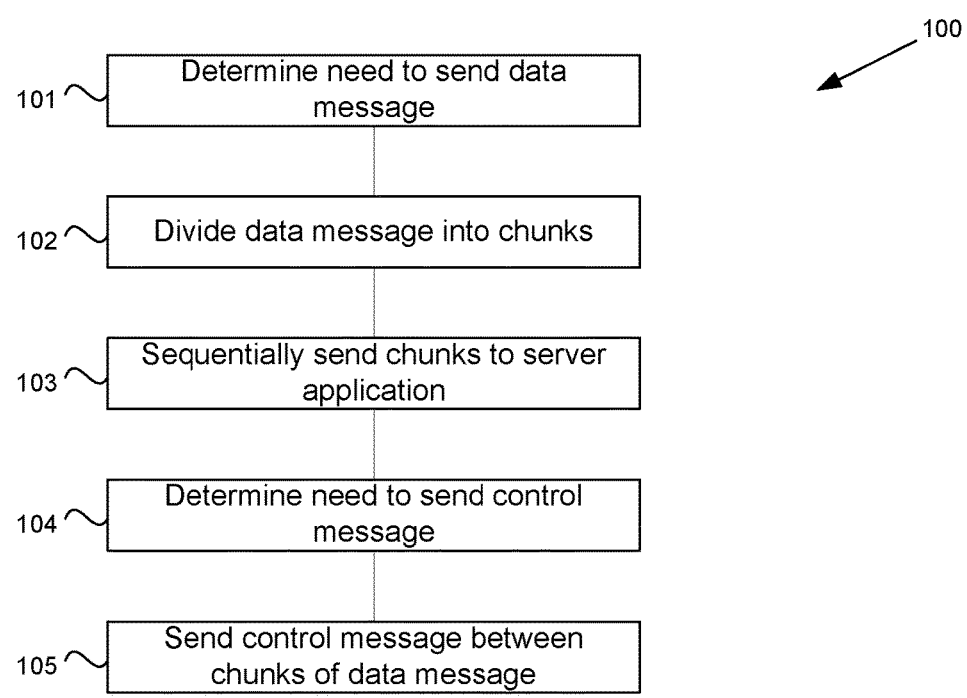
FIG. 2 depicts a method for communicating between the client application and the server application.

The essence of the system 10 is to transfer any smaller control messages while the large data message is being transferred. An embodiment of the procedure is depicted in the flowchart 100 of FIG. 2. At step 101, the client application 12 determines a need to send a data message from the client device to a server device. At step 102, the client application divides the large data message into chunks of a determined size. The client application then sequentially sends each chunk of the data message in an individual data packet to the server application 22 (step 103). During the sending of the chunks, the client application determines a need to send a control message from the client device to the server device (step 104). The client application has the opportunity to send a control message before each data message chunk is transferred (step 105).

Each of the client application 12 and server application 22 includes a data transfer module 14, 24 that operates to send and receive messages. Each of the client application 12 and server application 22 also includes a chunking module 16, 26 that, on a client, operates to split a large message into smaller pieces ("chunks") and send the chunks as data packets, and on a server operates to receive the data packets and to reconstitute the chunks into the full message.

The client application 12 opens a network connection to a server application 22. The client application 12 initiates transfer of a large data message such as a video file/stream, archive, log file, etc. using the client data transfer module 14. During transfer of the large data message, the application also sends one or more control messages using the client data transfer module 14. The client data transfer module 14 sends the data message and control messages to the server chunking module 26 using the client chunking module 16. The client chunking module 16 sends the data message in pieces ("chunks"). When the application sends a control message, the client chunking module 16 sends the control message to the server chunking module 26 in between chunks of the data message. The client chunking module 16 determines how many bytes will be sent in each chunk. The client chunking module 16 encodes each chunk and control message into a messaging packet using a messaging protocol understood by it and the server chunking module 26.

The server chunking module 26 receives data message chunks and control messages 15. It reconstitutes the data message chunks into the data message. It passes both the data message and control messages to the server data transfer module 24, which pass them to the server application 22.

Figure 3:
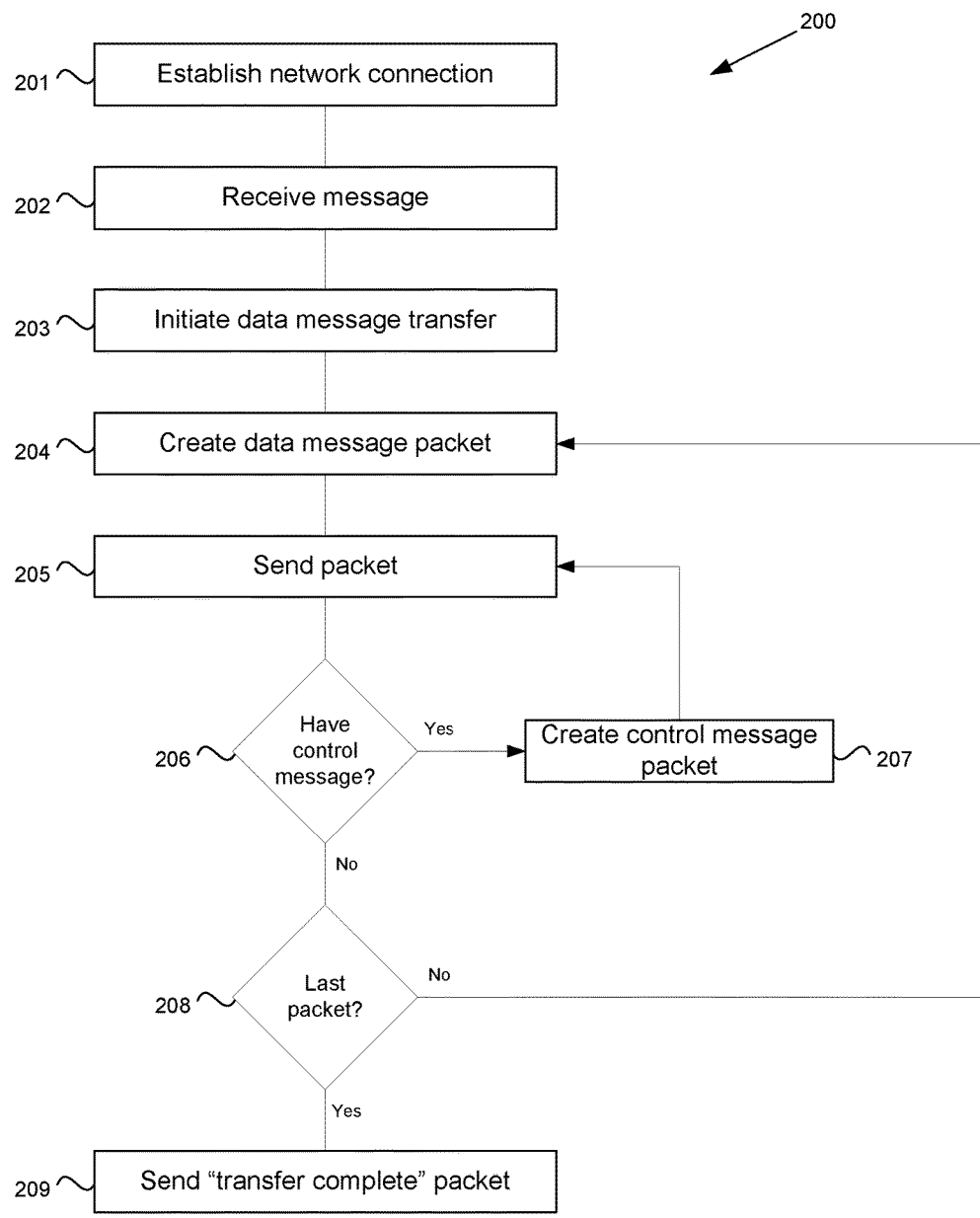
FIG. 3 depicts a method for interspersing control message packets between data message packets.

An example of the process undertaken by the client application 12 is depicted in the flowchart 200 of FIG. 3. At step 201, the client application opens a network connection to the server application 22. The client chunking module 16 receives a data message from the data transfer module 14 (step 202) and initiates the transfer of the data message 203. To transfer the message, the client chunking module 16 creates a data message packet 204 and sends the packet 205 on the open network connection to the server chunking module 26.

After sending a packet of the data message, the chunking module determines whether there is a control message to be sent to the server application 206. In one embodiment, the data transfer module 14 provides an interrupt or similar signal to the client chunking module 16 whenever the client application 12 requires a control message to be sent. The client chunking module 16 listens for interrupts between sending data packets. In another embodiment, the data transfer module adds the control message to a queue in the client chunking module whenever the client application requires a control message to be sent. The client chunking module checks its queue for control messages between sending data packets, and if there are any control messages in its queue it will send those before resuming sending data packets.

If a control message is to be interspersed into the sequence of data message packets, the client chunking module 16 receives the details of the control message from the client data transfer module 14 and sends a control message packet to the server chunking module 26 on the same open network connection (step 207) that is being used to send the data message packets.

If at step 206, the chunking module determines that there is no control message to be sent, the process proceeds to step 208 in which the client chunking module 16 determines if the last data packet of the data message has been sent. If not, the process returns to step 204 to create the next data message packet. If the last data packet has been sent, the client chunking module 16 creates and sends a "transfer complete" packet to the server chunking module 26 (step 209) indicating that transmission of the data message is complete.

Figure 4:
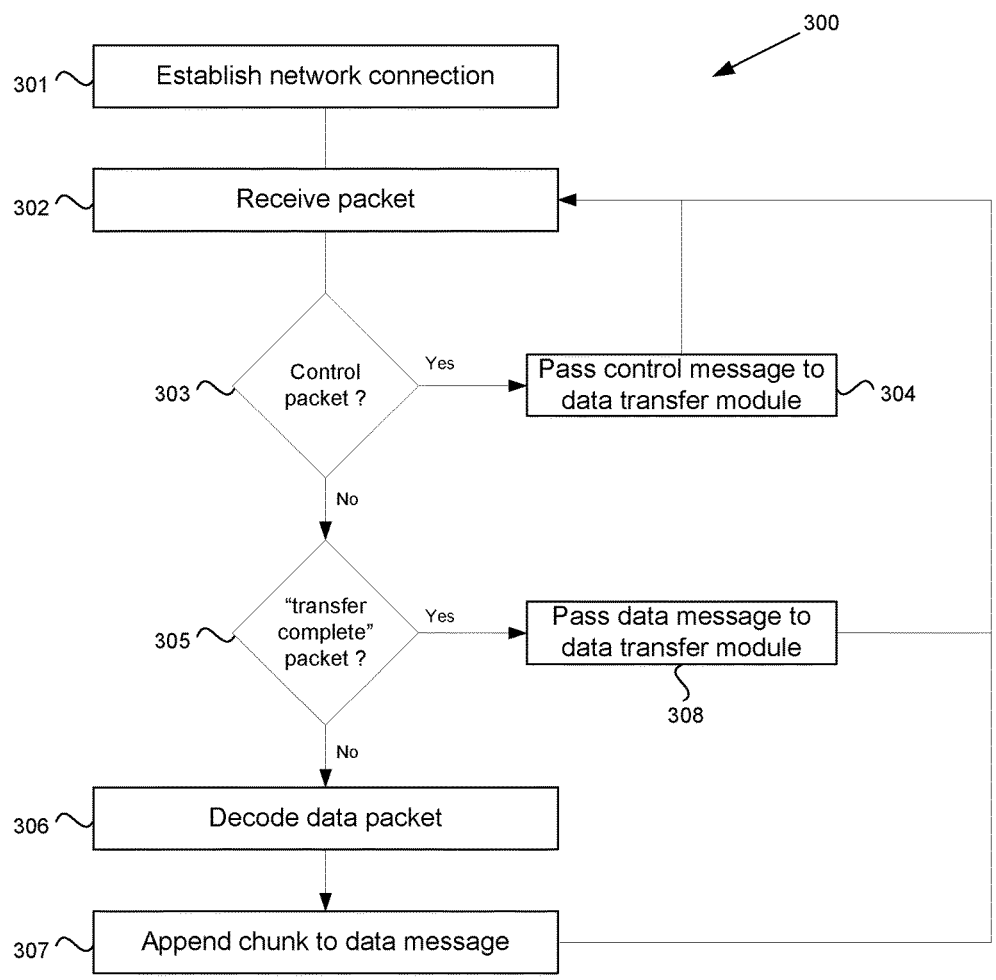
FIG. 4 depicts a method for reconstituting a data message while allowing real-time processing of control messages.

An example of the process undertaken by the server application 22 is depicted in the flowchart 300 of FIG. 4. At step 301, the server application 22 establishes the network connection with the client application 12 and then receives a packet into the server chunking module 26 (step 302). The server chunking module 26 then determines whether the packet is a control message packet or a data message packet (determination 303). If the message packet is a control message, the chunking module 26 passes the control message to the server data transfer module 24 (step 304) which can then ensure that any control operation specified in the control message packet is performed. The process then returns to step 302 to receive the next message packet. If the determination 303 determines that the message packet is a data message packet, the process then determines if the data message packet indicates completion of a data message transfer. If not, then the server chunking module 26 decodes the data packet (step 306) and appends the data chunk to a data message that is assembled, chunk by chunk, in a data message buffer (step 307). If step 305 determines that the data message transfer is complete, the chunking module 26 passes the entire data message buffer to the data transfer module (step 308) so that the server application may process the complete data message as appropriate, including performing any subsequent operations on the complete data message, such as storing the data in a database, analyzing the data, etc. The process then returns to step 302 to receive any further message packets. Alternatively, the network connection may be closed.

The client chunking module 16 and server chunking module 26 may communicate using a common messaging protocol. The protocol specifies, for each messaging packet:
1. Whether the packet is a control message or a data message chunk;
2. The size of the packet payload;
3. A unique identifier for the message;
4. An identifier for the chunk;
5. The payload.

When sending a data message, each chunk receives an identifier assigned by the client chunking module 16, beginning with 1 and incrementing by 1 for each subsequent chunk. The chunk identifier is used by the server chunking module 26 to reconstitute the data message correctly if a chunk is received out-of-order.

The server chunking module 26 may send a message acknowledging receipt of each packet to the client chunking module 16. If there is any error in receiving a portion of a message, the server chunking module 26 may send a request to the client chunking module 16 to re-send a specified chunk.

The server chunking module 26 may send a request to stop transfer of a specified data message to the client chunking module 16, for example, if the server chunking module has encountered an unrecoverable error in reconstituting the data message, or based on one or more control messages at the server application. The client chunking module 16 may send a message to the server chunking module 26 indicating that it is aborting transfer of a specified data message.

The client chunking module and server chunking module may determine cooperatively the size of each chunk prior to initiating the transfer of the data message. For example, the client chunking module 16 may change the size of chunks based on application requirements, network performance, or other parameters. Conversely, the server chunking module 26 may request that the client chunking module 16 change the size of chunks based on application requirements, network performance, or other parameters.

The chunking modules are operable to support transferring multiple data messages in parallel. Each data message has a unique identifier which allows the server chunking module to resolve each chunk into the appropriate data message.

The message communication protocols described above may be implemented and employed directly within a single networked software application, or be packaged as part of a software library to be utilized by a multiplicity of networked software applications. The library/application may be an object request broker (ORB) or messaging system; a client/server or peer-to-peer file transfer system; a video streaming application; or any other networked application that needs to send control messages while a large data transfer is in progress.

The above described methods provide an improvement over standard solutions by utilizing network and operating system resources more efficiently. Using these methods for transferring control messages and large data messages results in efficient usage of network connections while allowing time-sensitive control messages to be sent in a timely fashion.

The components of the system 10 may be embodied in hardware, software, firmware or a combination of hardware, software and/or firmware. In a hardware embodiment, the client application and the server application may each be executed on a processor of respective client and server devices. The respective applications may be stored as a set of executable instructions in a memory of the device that is operatively associated with the processor.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for moving an object request broker comprising at least one registered service from a source server to a destination server, the method comprising:
   communicating a URL of each service registered with the source server to the destination server;
   creating a server connection in the destination server for the URL of each service from the source server;
   suspending processing of new service requests for the at least one registered service in the source server;
   queuing service requests received by the source server from one or more clients after the suspension of service request processing;
   establishing a destination object request broker in a destination server;
   while processing of new service requests to the source server are suspended, registering the at least one service in the destination object request broker; and
   responding to the queued service requests from the source server to the one or more clients with an identity of the destination object request broker.

2. The method of claim 1 wherein establishing a destination object request broker comprises establishing a destination server context at the destination server, the destination server context comprising the destination object request broker and a server context identity that is the same as a server context identity of a source server context.

3. The method of claim 2 wherein the server context identity is independent of a network address of the source server.

4. The method of claim 1 comprising communicating a URL of the at least one service registered with the destination object request broker to the source server.

5. The method of claim 4 wherein responding to the queued service requests comprises communicating a URL for a requested service received from the destination server context by the source server to the client.

6. The method of claim 5 comprising:
   receiving a response to a queued request in a client; and
   updating an endpoint in the client with a URL indicated in the response.

7. The method of claim 6 comprising:
   creating a new connection at the client to the destination server using the URL indicated in the response; and
   retrieving a cached service request in the client.

8. The method of claim 1 comprising deconstructing a source server context after responding to the plurality of queued service requests.

9. The method of claim 1 comprising, while processing of new service requests to the source server are suspended, communicating the at least one service from the source server to the destination object request broker.

10. The method of claim 6 comprising resending the cached service request using the new connection.

11. A non-transitory computer readable medium comprising instructions that when read by a processor, cause the processor to perform:
communicating a URL of each service registered with the source server to the destination server;
creating a server connection in the destination server for the URL of each service from the source server;
suspending processing of new service requests for the at least one registered service in the source server;
queuing service requests received by the source server from one or more clients after the suspension of service request processing;
establishing a destination object request broker in a destination server;
while processing of new service requests to the source server are suspended, registering the at least one service in the destination object request broker; and
responding to the queued service requests from the source server to the one or more clients with an identity of the destination object request broker.

12. The non-transitory computer readable medium of claim 11, wherein establishing a destination object request broker comprises establishing a destination server context at the destination server, the destination server context comprising the destination object request broker and a server context identity that is the same as a server context identity of a source server context.

13. A system comprising:
at least one processor; and
at least one memory;
wherein the at least one processor and the at least one memory are communicably coupled to one another;
wherein the at least one processor is configured to:
communicate a URL of each service registered with a source server to a destination server;
create a server connection in the destination server for the URL of each service from the source server;
suspend new service requests for the at least one registered service in the source server;
queue service requests received by the source server from one or more clients after the suspension of service requests;
establish a destination object request broker in a destination server;
while new service requests to the source server are suspended, register the at least one service in the destination object request broker; and
respond to the queued service requests from the source server to the one or more clients with an identity of the destination object request broker.

14. The system of claim 13, wherein an establishment of the destination object request broker comprises an establishment of a destination server context at the destination server, the destination server context comprising the destination object request broker and a server context identity that is the same as a server context identity of a source server context.

15. The system of claim 14 wherein the server context identity is independent of a network address of the source server.

16. The system of claim 13 wherein the at least one processor is configured to communicate a URL of the at least one service registered with the destination object request broker to the source server.

17. The system of claim 16 wherein the response to the queued service requests comprises a communication of a URL for a requested service received from the destination server context by the source server to the one or more clients.

18. The system of claim 17 wherein the at least one processor is configured to receive a response to a queued request in the one or more clients; and
update an endpoint in the one or more clients with a URL indicated in the response.

19. The system of claim 18 wherein the one or more processors are configured to:
create a new connection at the client to the destination server using the URL indicated in the response;
retrieve a cached service request in the client; and
resend the cached service request using the new connection.

20. The system of claim 13 wherein the one or more processors are configured to deconstruct a source server context after the response to the plurality of queued service requests.

* * * * *